US005822780A

United States Patent [19]
Schutzman

[11] Patent Number: 5,822,780
[45] Date of Patent: Oct. 13, 1998

[54] METHOD AND APPARATUS FOR HIERARCHICAL STORAGE MANAGEMENT FOR DATA BASE MANAGEMENT SYSTEMS

[75] Inventor: Neil F. Schutzman, Marlborough, Mass.

[73] Assignee: EMC Corporation, Hopkinton, Mass.

[21] Appl. No.: 775,828

[22] Filed: Dec. 31, 1996

[51] Int. Cl.$^6$ ....................................................... G06F 17/00
[52] U.S. Cl. ........................... 711/165; 711/114; 711/117; 711/161; 707/2; 707/104; 707/204
[58] Field of Search ......................... 707/1–10, 100–104, 707/200–206; 711/111–117, 161–173

[56] References Cited

U.S. PATENT DOCUMENTS 5,564,037  10/1996  Lam ......................................... 711/161
5,579,507  11/1996  Hosouchi et al. ....................... 711/171

OTHER PUBLICATIONS

Sunita Sarawagi Computer Science Division, 396 Soda Hall University of California, Berkeley, California 94720 Query Processing in Tertiary Memory Databases—Proceedings of the 21st VLDB Conference, Zurich, Switzerland, 1995.

Sunita Sarawagi Computer Science Division University of California, Berkeley Database Systems for Efficient Access to Tertiary Memory.

David Isaac The Mitre Corporation McLean, VA Hierarchical Storage Management for Relational Databases—Twelfth IEEE Symposium on Mass Storage Systems, pp. 130–144, Apr. 1993.

Bruce K. Hillyer, Avi Silberschatz Bell Labs Random I/O Scheduling in Online Tertiary Storage Systems.

Data Management Interfaces Group, Version 2.1 Mar. 1995, Interface Specification for the Data Management Application Programming Interface—Draft for Industry Review.

*Primary Examiner*—Wayne Amsbury
*Assistant Examiner*—David Fiuk Jung
*Attorney, Agent, or Firm*—Maureen Stretch

[57] ABSTRACT

A hierarchical storage management system for database management systems that divides a database logically into separately managed regions, with each region being described by an entry in a vector kept in a regions file. The region entry contains a time stamp of the last time the region was accessed, the staging identifier of the region if it has been migrated, the base level backup staging identifier of the region if it has been baselined, and an indicator telling whether or not the region is resident online. Each managed region of the database is migrated to a separate staging file. When the database software issues a read or write input/output operation, the present invention sends the migration software a signal signifying this has occurred. The migration software of the present invention then updates the accessed time stamp, and checks to see if the region is resident. If it is not resident, it is staged in. The present invention creates and updates a migration candidate list ordered by date last accessed and region size. Both demand staging by the HSM, and user—initiated staging can then operate on the migration candidate list to migrate suitable files to tertiary storage.

12 Claims, 12 Drawing Sheets

| Last accessed | Size | Region | File |
|---|---|---|---|
| 10/20/95 | 100K | | file.a |
| 10/23/95 | 97K | region 3 | file.dbs |
| 10/24/95 | 100k | region 2 | file2.dbs |
| 10/25/95 | 80k | | file.b |
| 10/31/95 | 100k | region 1 | file.dbs |

METHOD AND APPARATUS FOR HIERARCHICAL STORAGE MANAGEMENT FOR DATA BASE MANAGEMENT SYSTEMS

BACKGROUND OF THE INVENTION

1. Field of the Invention

This invention relates generally to the area of data storage on a storage medium and more particularly to hierarchical storage management for database systems.

2. Background

A continuing problem in computer systems has been handling the growing amount of information or data available. Data that cannot be kept in the computer's main memory has typically been saved and stored on secondary memory, usually random access disk storage systems. In earlier times such data was often stored as a simple sequential "flat" file on disk. As database technology evolved, flat files were combined into relational databases of significant size and complexity and stored on redundant arrays of independent disks (RAID) disk systems also of significant size and complexity.

Instead of access by simple access method routines and user programs, such files are now managed with sophisticated data management programs, such as DataBase Management Systems (DBMS). DBMS programs allocate data physically on the storage medium and then relate these physical allocations to the logical structure of the data.

The sheer amount of information being stored on disks or other media for databases in some form has been increasing dramatically over time. While files and disks were measured in thousands of bytes a few decades ago, then millions of bytes (megabytes), followed by billions of bytes (gigabytes), now databases of a million megabytes (terabytes) and even billions of megabytes (petabytes) are being created and used.

At the same time, a rule of thumb based on the Pareto principal tends to apply, leading to much waste and inefficiency. Often referred to as the 80/20 rule, the principal as applied to databases is that it is likely that only 20% of the data is accessed 80% of the time. The remaining 80% of the data is accessed much less frequently, if at all. As the size of a database continues to grow, keeping the rarely accessed portion of it online in disk storage connected to a computer system can be an increasingly costly and wasteful strategy.

Even worse in terms of space efficiency than file systems which tend to grow as more data is stored, are databases that are preallocated to take advantage of hash algorithms and clustering. This results in large areas of disk space marked as "used" when, in fact, they only contain initialized, but empty, database pages. While this space will eventually be used, it may take weeks or months or longer, while the disk space usually could have been put to better use in the interim.

Most present-day relational databases systems are made up of records that are grouped into database pages, that are, in turn, logically grouped into clumps of pages that are the targets of input/output (I/O) operations. These, in turn, are often grouped into files.

Figure 3:
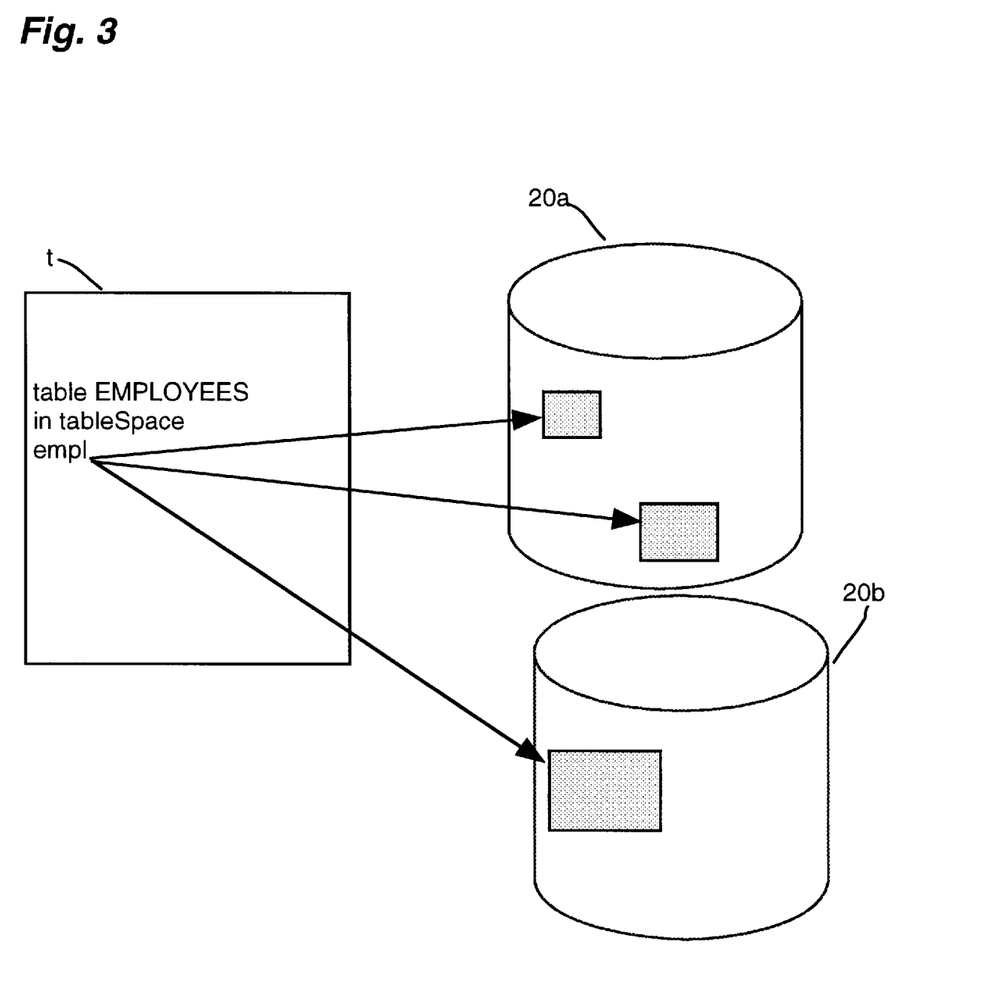
FIG. 3 is a schematic diagram of a relational database.

A database management system software program physically places this data in some structure on disks and then abstracts a logical definition from the physical implementation of the database. The mapping from logical to physical is done with such concepts as tablespace in Oracle, dbspace in Informix, and database devices in Sybase systems. As suggested by the different terms, each of the leading database vendors uses a different structure for allocating files and constructing these relationships. Each system usually maps logical tables to one or more files or raw partitions (in Unix systems, these are files that are not formatted as Unix filesystems) on disk storage, as illustrated in FIG. 3. As a database grows, files and raw partitions can be added to the database storage space in a way that is transparent to the logical schema model and user application programs.

Although raw partitions are favored by some users for performance purposes, most databases are implemented as files. In either case, these are usually limited to 2 gigabytes of size per storage file, in 32-bit addressing computers. This makes the typical large database a potentially very large collection of large files. For example, a 100 gigabyte database might be a minimum of 50 files and a terabyte database might be a minimum of 500 files.

Within a database, different record types may be stored in the same storage areas (clustering) or one record type may span many storage areas (a form of disk striping). How this is set up has a major effect on database performance and is thus usually controlled by the database administrator. This kind of variability complicates the task of organizing the database in terms of most recent use.

One solution for handling unused or low use individual files of a database is archiving, or moving the entire file to another area. As a file is no longer used, archiving moves it in its entirety to a less expensive, tertiary storage medium, such as magnetic tape or optical media. However, archiving is usually not a suitable approach for many databases, since databases are usually composed of multiple files that are interconnected by referential integrity constraints and access methods, such as B-trees's and hash tables. Archiving some database files can break these relationships rendering an invalid view of the data.

However, it is possible for each storage area within the database to be set up independently. If this is done and rigorously enforced, old or infrequently used storage areas can be archived by some database management systems, such as Oracle's system. In this approach, the files that make up the infrequently used storage area are moved off line and not accessed.

Figure 4:
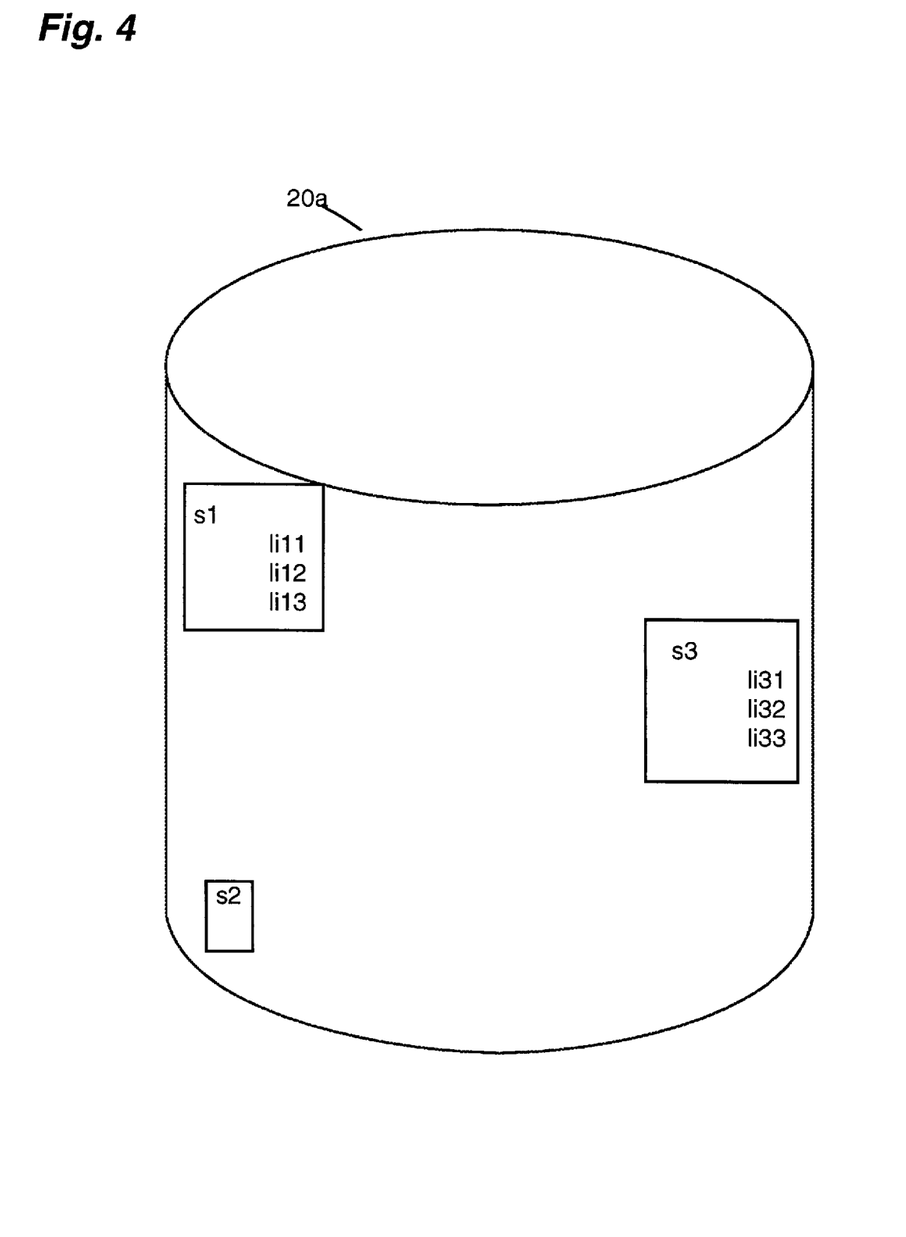
FIG. 4 is a schematic diagram of the clustering of records in a preallocated database.

Even in systems such as Oracle's that permit archiving, certain types of queries can defeat such optimizing strategies. For example, databases tend to spread information in their storage areas so that the information that needs to be accessed together can be clustered while still preserving data independence. (See FIG. 4 for an example of this.) Because of this spread, databases are rarely optimized for sequential searches. In relational databases, in fact, sequential searches are usually discouraged in favor of the ability to do "joins." Consequently, a sequential search of part of a database may affect several areas, making them all "active" as far as the archiving strategy is concerned. The same is true for full or partial backups of the database. Any full sequential search of the database will make the whole database "active" and thus independent parts of it may no longer be candidates for archiving.

Another approach to improve space usage includes database backups that allow the database to be moved in its entirety to a less expensive medium, so that the disk space can be used for other tasks. However, database backups are very time consuming. Even using an incremental on-line database backup (that only saves records that have changed), or "baselining," (which makes a complete new backup copy of a database to speed up later restoration) each record in the database must be read to determine if it needs to be backed up. In this approach, archiving can also be defeated, since a full sequential read makes all records current or "active." With databases of multiple gigabyte, terabyte, and soon, petabyte sizes, backups can take hours or even days to accomplish, in some situations. Restoring the complete database can take even longer.

Hierarchical storage management (HSM) systems have been used to migrate the contents of infrequently accessed files to tertiary storage. Migration, as the term implies, moves the data to tertiary storage but also keeps track of it so that if it is requested later, it can be brought back into secondary storage. However, HSM systems usually operate at the file level only. This approach is not useful for databases for some of the same reasons that archiving at the file level only is not useful.

Much of the data in commercial databases, for example, is entered over time by transaction processing systems, and then not accessed again until it is rediscovered by someone doing data mining or by a data warehouse request. Even though most of the records in such a database follow this pattern, the database will be continually active since it is accessed regularly by the transaction processing system.

Similarly, most databases also contain a considerable amount of control information, such as headers that describe all files and meta-data associated with the database, hash tables, free space maps, and possibly precompiled queries or fourth generation language applications. All of this control data is fairly dynamic, and will be read in frequently making the database "active." Migrating at the file level with current HSM systems can result in significant performance problems. For example, if a file is 2 gigabytes and transfers occur at 1 megabyte per second it would take almost 41 minutes to migrate the file out or in.

Another obstacle for existing HSM systems is that they are usually not written to take into account the specific file structure differences of each database format. As mentioned, each of the major relational database programs presently available creates a different database structure. The internal organization of a database created by the Oracle program differs from the internal structure of one created by Sybase or Informix. Primarily because of these structural differences, an HSM system cannot easily determine which parts of the database are active and which parts are not.

Another attempted solution to the storage usage problem for large databases involves redesigning the database DBMS software program, by redesigning either its storage management functions or its query structure or both to provide migration capabilities. Most existing DBMS software, for example, is designed to work solely with data stored on disk, not with magnetic tape or other media. Both data structure and access times are different for other media, hence the attempts to redesign the database software. Similarly, most DBMS programs available today attempt to keep the physical manipulation of data and records "invisible" or transparent to the user. So, when a user wishes to search for all records containing value x, the user need not know how the files are physically stored and accessed on the disk. The most logical approach to tackling the migration problem for infrequently used data is to modify or redesign the DBMS software that does the physical manipulation.

However, for computer users with large, existing database systems based on current database software products such as Oracle's, or Sybase's or Informix' relational database software, converting to new database software is often impractical or extremely expensive, or both. For database providers, modifying their existing products to address these problems can also be costly and risky. It may take extensive development time and costs to do so, and if the change is too great, customers may experience difficulties in converting to the new versions of the existing software.

It is an object of the present invention to provide a hierarchical storage management system that enables the migration of infrequently used database portions to tertiary storage, while preserving the integrity and validity of the database.

Still another object of the present invention is implementing a hierarchical storage management system for database management programs without requiring new database management software or modifications to existing database management software programs.

Yet another object of the present invention is providing a hierarchical storage management system for database management programs that helps improves both online and offline data base backup performance.

SUMMARY OF THE INVENTION

These and other objects are achieved by a hierarchical storage management system for database management systems that divides a database logically into separately managed regions, with each region being described by an entry in a vector kept in a regions file. The region entry contains a time stamp of the last time the region was accessed, the staging identifier of the region if it has been migrated, the base level backup staging identifier of the region if it has been baselined, and an indicator telling whether or not the region is resident online. Each managed region of the database is migrated to a separate staging file. When the database software issues a read or write input/output operation, the present invention sends the migration software a signal signifying this has occurred. The migration software of the present invention then updates the accessed time stamp, and checks to see if the region is resident. If it is not resident, it is staged in. The present invention creates and updates a migration candidate list ordered by date last accessed and region size. Both demand staging by the HSM, and user—initiated staging can then operate on the migration candidate list to migrate suitable files to tertiary storage.

DETAILED DESCRIPTION OF THE INVENTION

Figure 1A:
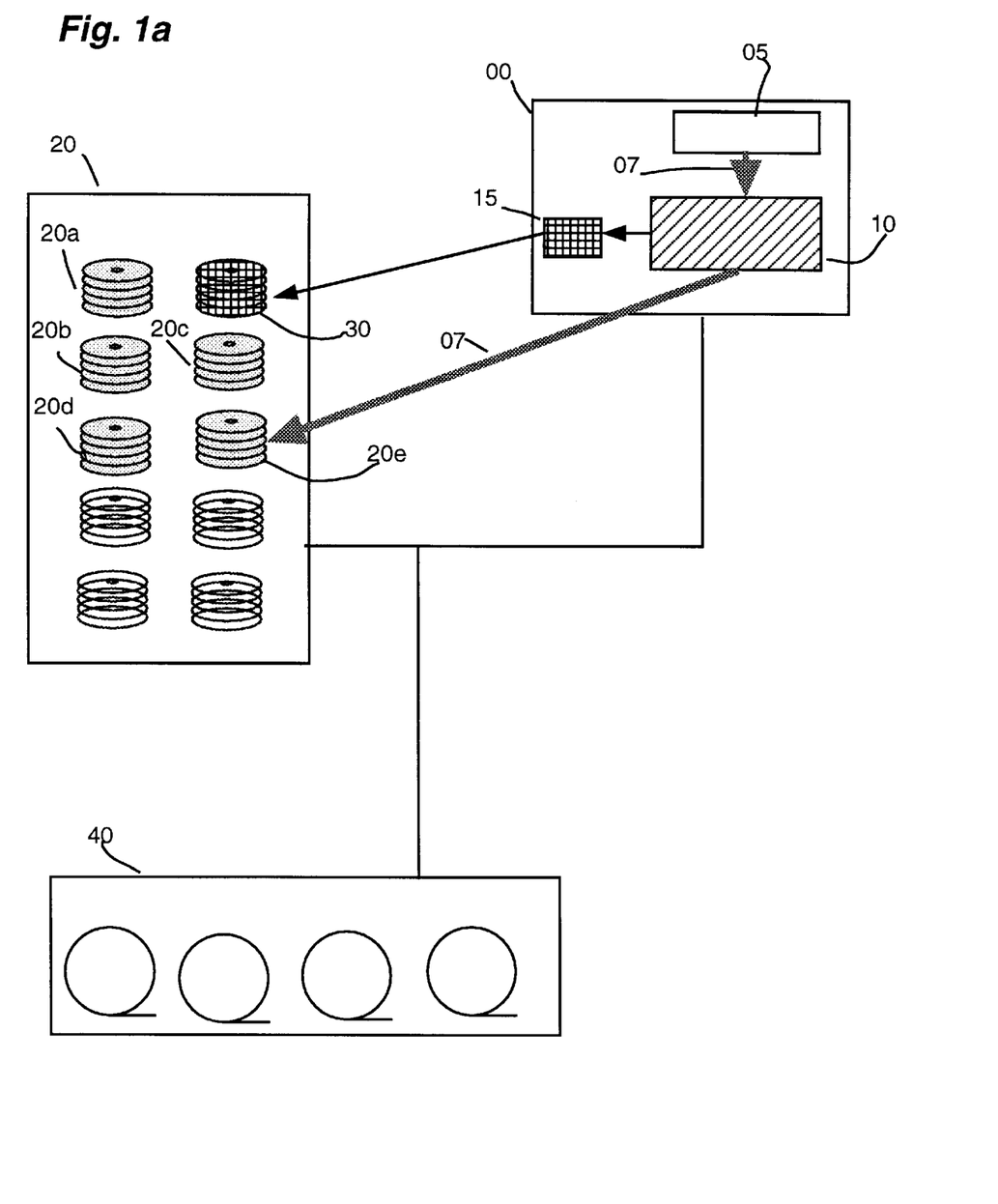
FIG. 1a is a schematic block diagram of the present invention.

As shown in FIG. 1a, secondary storage in the form of disks 20 and tertiary storage in the form of a tape robotics library 40 are shown in communication with a computer system 00. Database software 05 is shown executing in computer system 00. Database software 05 in this example created and maintains a database stored on physical disks 20a through 20e of local disks 20. Input/output interceptor 10 is shown intercepting an I/O request 07 from database software 05. In a preferred embodiment of the present invention, interceptor 10 communicates with migration software 15. Migration software 15, operating as part of or in communication with an HSM system, in a preferred embodiment, analyzes the intercepted I/O request 07 by finding its vector entry in regions file 05, updating the time accessed stamp in that vector entry, checking to see if that region is resident on local disk 20e, and if not, making it resident. Thereafter, control is returned to interceptor 10, which will permit I/O request 07 to proceed to access the requested region on disk 20e. In the example shown in FIG. 1a, this might be a read or write application to the information physically stored on disk 20e of local disks 20.

Figure 1B:
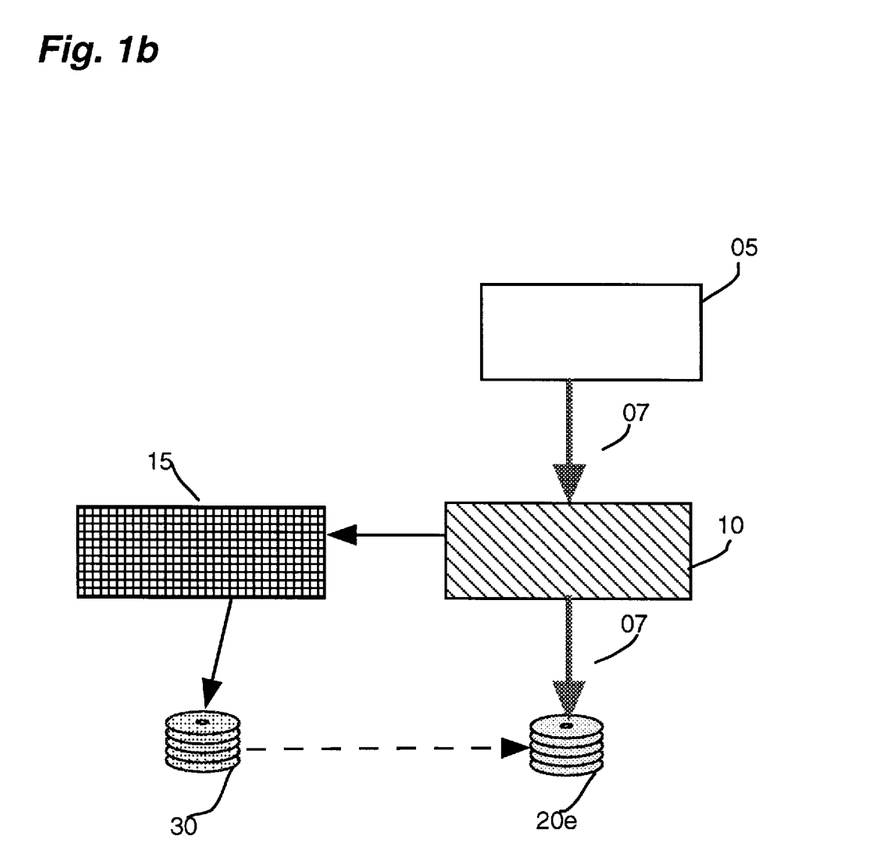
FIG. 1b is a schematic block diagram of another view of the present invention.

In FIG. 1b, part of this is shown in a simpler diagram. Here, database software 05, which could be any type of software designed to access information on disks or databases, whether in a relational structure or not, is shown issuing an I/O request 07. Interceptor 10, is shown intercepting I/O request 07. In a preferred embodiment, interceptor 10 is a software program that is part of a file system that conforms to the proposed industry standard data management application programming interface specification (DMIG) prepared by the XOPEN standards organization. However, as will be apparent to those skilled in the art, any file system can be used as long as some way exists for a programmer to write a program to intercept I/O requests. In Unix-based systems for example, privileged programs can be written to intercept I/O requests made to the operating system's file management and kernel software. In the MVS operating systems from IBM, privileged programs can be written to intercept supervisor calls involved in I/0 requests. In other operating systems, similar programs can usually be written by those skilled in the art. In any case, all I/O requests made to local disks 20 are intercepted by interceptor 10.

In a preferred embodiment, once a request has been intercepted, interceptor 10 creates an event that signifies to migration software 15 that an interception has occurred. Migration software 15 operates as part of an HSM system in a preferred embodiment and creates and uses a managed regions file 30 to keep track of activity on the database residing on local disks 20a through 20e. When migration software 15 is notified of the occurrence of the interception, it reads the vector entry in the managed regions file 30 that covers that region of the database on disk 20e specified by the I/O request.

Figure 1C:
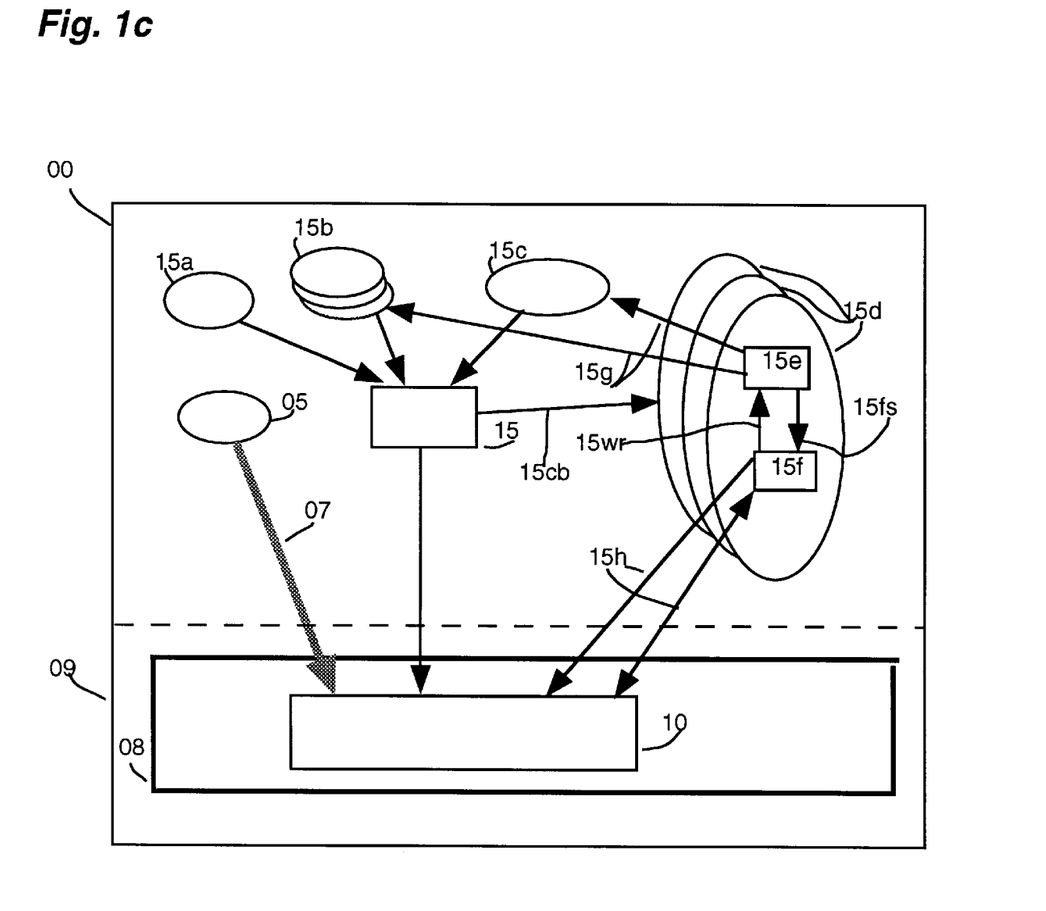
FIG. 1c is a schematic block diagram of the present invention as part of an overall HSM system.

Referring now to FIG. 1c, the HSM system of a preferred embodiment is shown. As seen here, migration software 15 includes an HSM aware application 15a, such as backup, a stage-in daemon 15b, a master daemon 15c, a migration service process 15e, and an HSM file system monitor 15f. A standard application, such as database software 05, makes an I/O request 07 which is intercepted by interceptor 10, operating as part of a filesystem 08 in the kernel 09 of the operating system controlling computer system 00. As seen in FIG. 1c, callbacks 15cb can cause work requests 15wr to be sent to migration service process 15e, as appropriate. HSM file system monitor 15f reads and writes data to local disks 20 through filesystem 08 as well, to satisfy migration requests.

Figure 2:
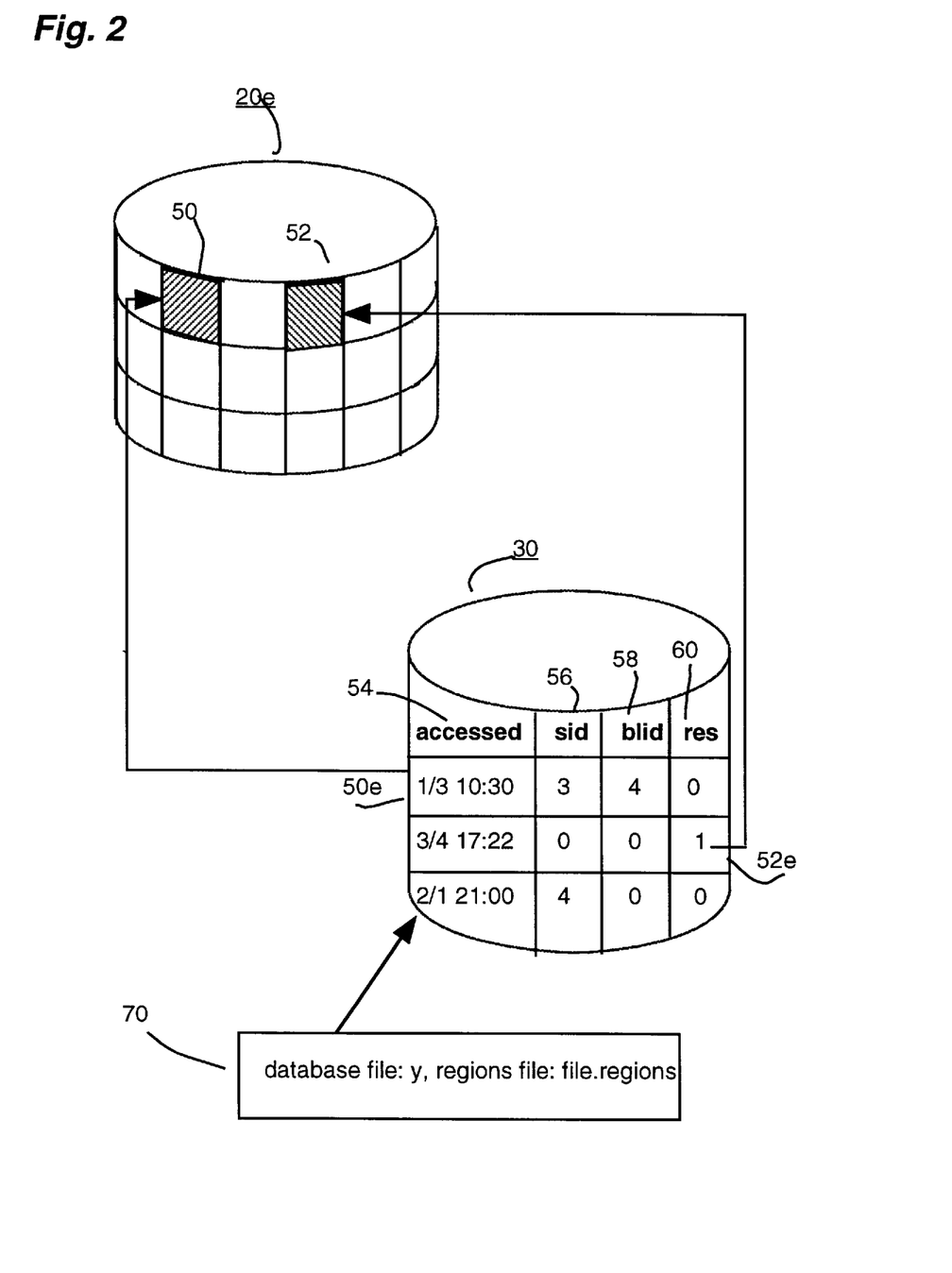
FIG. 2 is a schematic diagram of a region file according to the method and apparatus of the present invention.

Now turning to FIG. 2, it can be seen that managed regions file 30 contains two vector entries 50e and 52e, pointing to managed regions 50 and 52 respectively, on disk 20e. In the schematic of FIG. 2, the contents of vector entry 50e are shown. As illustrated, each entry contains a last accessed timestamp 54, a staging id (sid) 56, a baseline id (blid) 58, and a residency indicator (res) 60. In the example shown for entry 50e, the last accessed timestamp is shown as Jan. 3, at 10:30 hours. The staging id 56 for entry 50e is 3. In a preferred embodiment, staging id 56 tells migration software 15 how to locate the data if it has been migrated. In this example, there is also a baseline id 58, with a value of 4.

Figure 6:
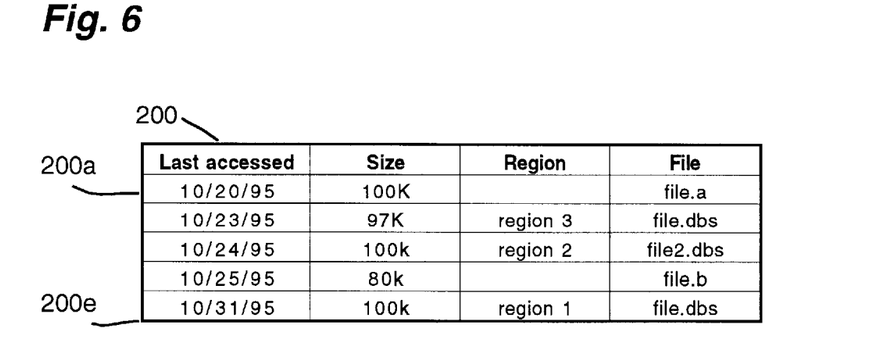
FIG. 6 is a tabular diagram of a staging candidates list according to the method and apparatus of the present invention.

Referring now to FIG. 6, a staging candidates list created according to the method and apparatus of the present invention is shown. As shown here, entry 200a would be the best immediate candidate for staging out to tertiary storage, since its last accessed timestamp is the oldest of those shown. As will be apparent to those skilled in the art, the particular methods used to stage the candidates out will depend on the HSM system used.

In a preferred embodiment, the HSM system used is capable of doing backups with baselining. Baselined backups create a fresh copy of the entire database, even those portions migrated out to tertiary storage. Although this is a lengthy process, it significantly improves the performance of a restore operation done from the fresh copy.

Continuing with the example of entry 50e in FIG. 2, residency indicator 60 is set to 0, which indicates that the portion of the database which is the target of I/O request 07 refers to a portion of the database that has already been migrated to tertiary storage and is therefore not resident on disk 20e. At this point, migration software 15 will cause the HSM system of which it is a part, to bring the data covered by vector 50e from tertiary storage 40 to disk 20e.

Figure 8A:
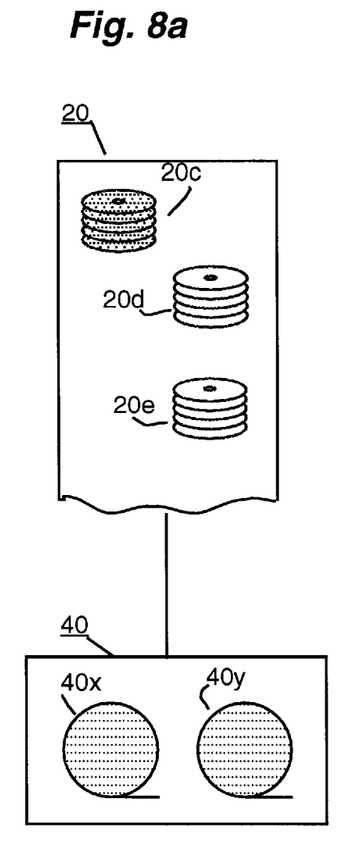
FIG. 8a is a schematic block diagram showing files that have been moved to tertiary media according to the method and apparatus of the present invention.
Figure 8B:
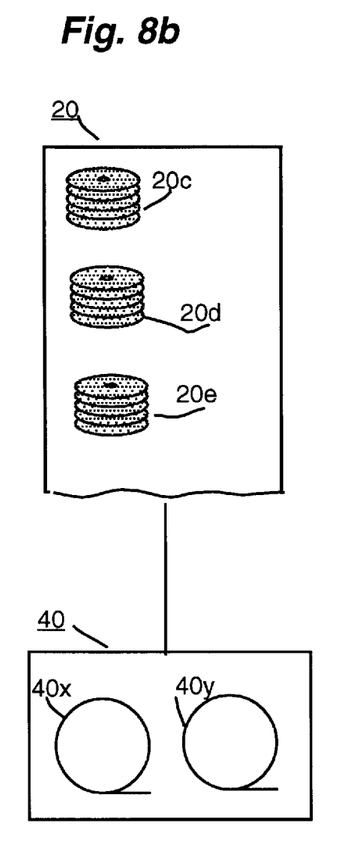
FIG. 8b is a schematic block diagram showing files that have been recalled to secondary storage according to the method and apparatus of the present invention.

Referring now to FIGS. 8a and 8b, this is illustrated. In FIG. 8a, if the portion of the database disk 20e that is the target of I/O request 07 is not resident, as shown by the unshaded disk 20e, the HSM software will locate that portion of the database on tertiary storage 40. Assuming that tertiary storage 40 is a robotic tape library, and that the portions that are being sought are located on tapes 40x and 40y, the HSM software will copy the data from those tapes onto disks 20d and 20e. FIG. 8b shows the status after the copying. In FIG. 8b, all three disks 20c, 20d and 20e are shaded, indicating that the portions of the database that were originally allocated to them are now resident on the respective disks.

Returning now to FIG. 1a, once migration software 15 has handled the interception, and in the case just shown, caused the non-resident data to be brought back in by the HSM system, migration software 15 relinquishes control so that interceptor 10 can continue. Since the function of interceptor 10 is now complete for this event, I/O request 07 is allowed to complete. If I/O request 07 is a read operation it will find the portion of the database to be read now resident on disk 20e and will proceed to read it as originally instructed to do by database software 05.

Figure 7:
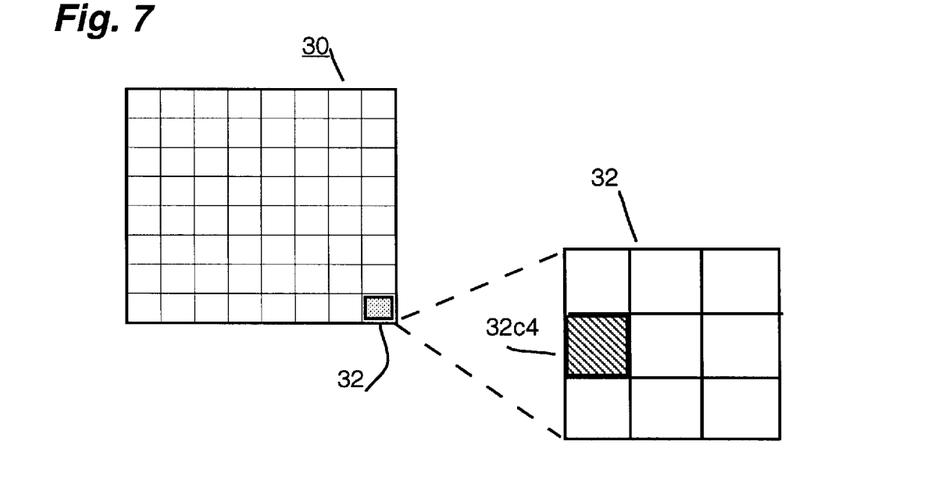
FIG. 7 is a schematic block diagram of a managed region according to the method and apparatus of the present invention.

Now referring to FIG. 7, a schematic diagram of managed regions file 30 is depicted. In a preferred embodiment, a managed regions file 30 is created for each file in a database that is identified to the HSM system of the present invention as needing managed region control. In determining how to divide a file within a database into managed regions, a preferred embodiment of the present invention takes into account the I/O buffer size of the database management system first. Ideally, the file will be divided into regions 32, in such a way that each I/O request to the file will be the size of one staging unit of the HSM system. In addition, in a preferred embodiment, the present invention also tries to optimize for tape speed, if tape is the tertiary media. An efficient tertiary transfer size can be created by rounding to the size of the database I/O request 07. This helps to keep performance of the system as a whole satisfactory. Further, in a preferred embodiment, the invention also tries to make the region 32 size a multiple of the record size that the HSM system will reliably stage out, so that when a chunk 32c4, for example, is staged out to tertiary storage, the "hole" that is punched in the region 32 by the staging of chunk 32c4 is exactly the same size as the staged out chunk 32c4.

Figure 5A:
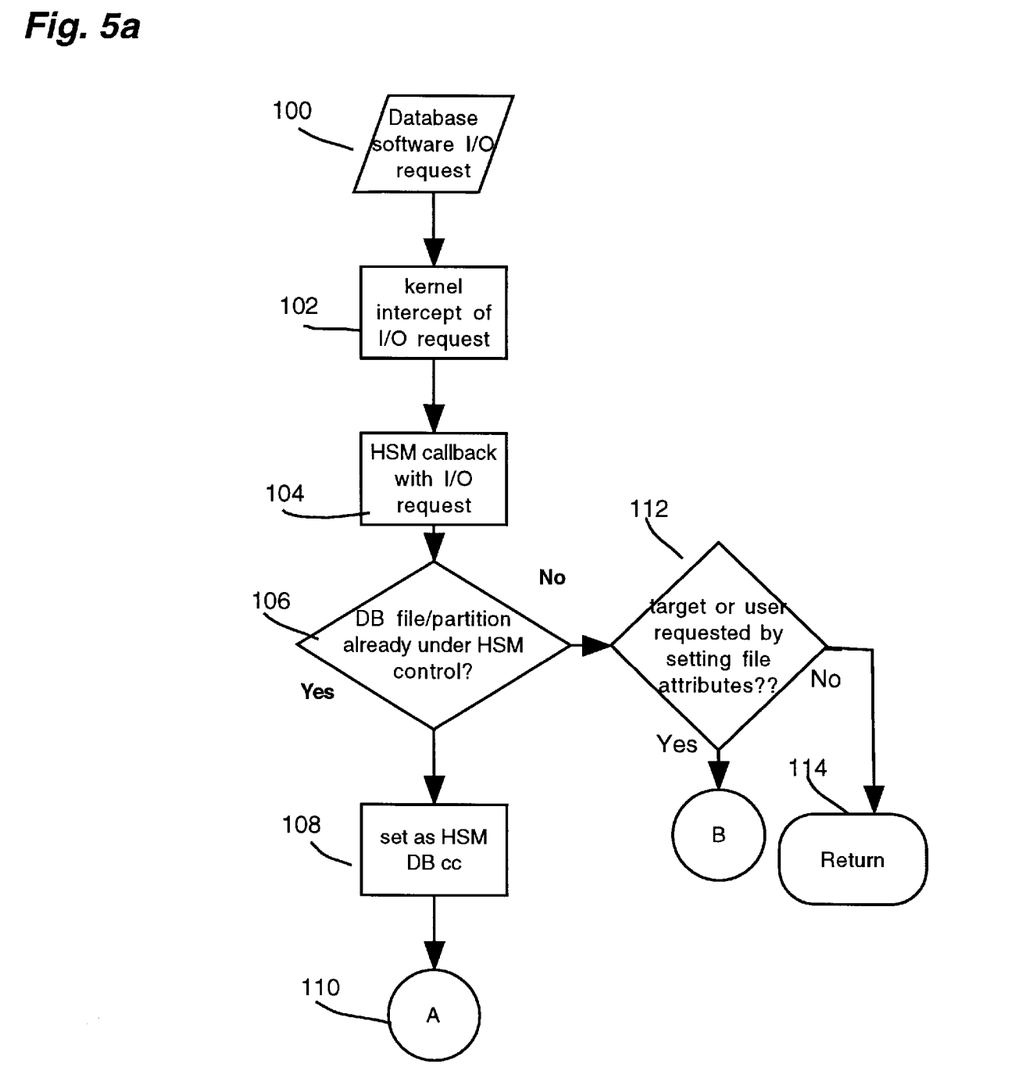
FIG. 5a is a flow diagram of the present invention.

With reference now to FIG. 5a, the detailed flow of the present invention is shown. As shown there, at step 100 database software 05 issues I/O request 07. This is intercepted by interceptor 10 at step 102. Next, at step 104, a callback to the HSM occurs, creating the event that notifies migration software 15 of the request. At decision block 106, migration software 15, which is now in control of the computer system 00, checks to see if the database file or partition is already under the control of the HSM system of the present invention. If not, control flows to decision block 112, to determine the nature of the I/O request. If the request has not been made to put this under HSM control, control returns to the caller at step 114. If HSM control is requested, in step 108 it is marked to indicate the need for dividing the file into regions. At step 110, control then flows to B, in the next flowchart.

Figure 5B:
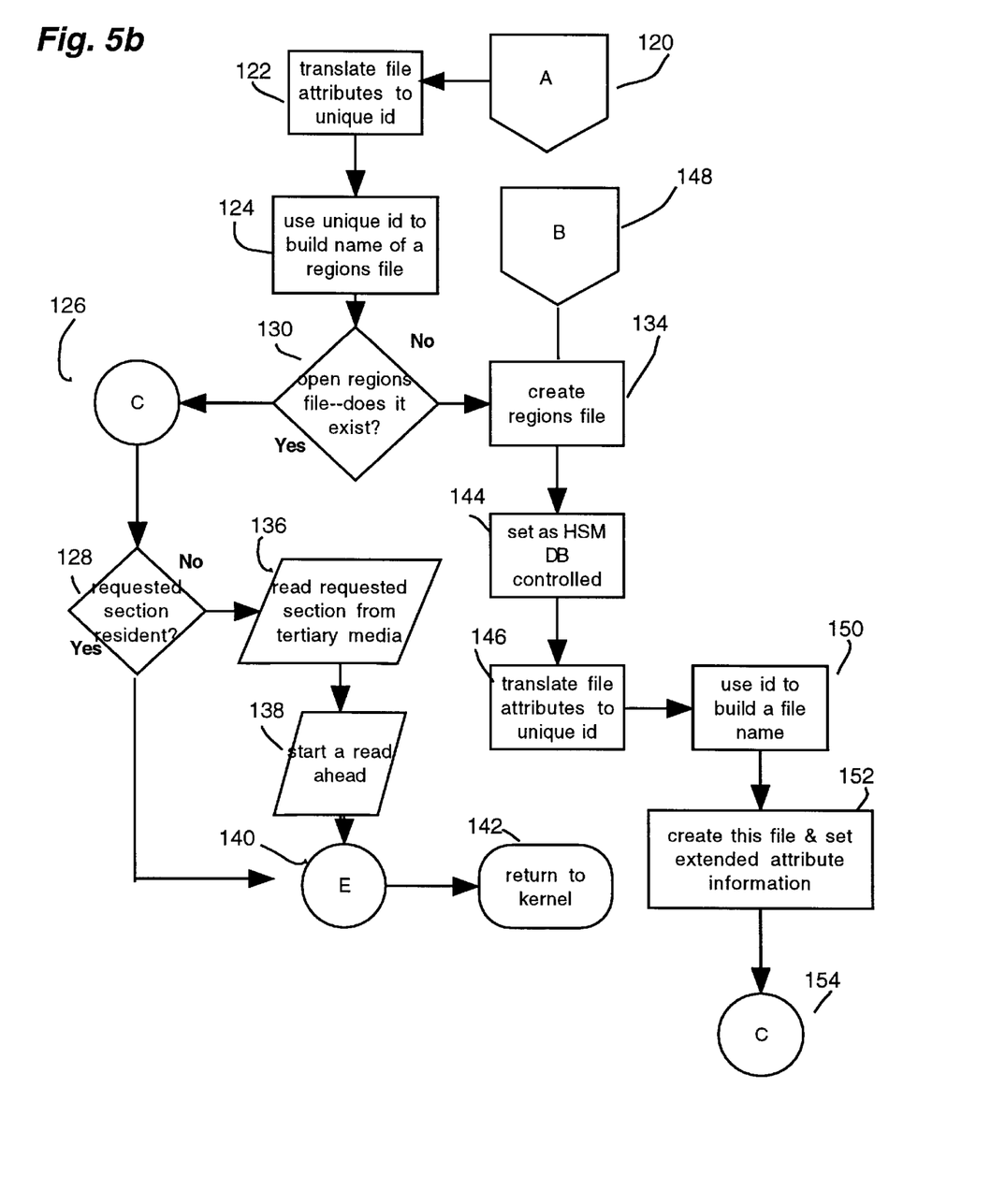
FIG. 5b is a flow diagram of the present invention.

Referring now to FIG. 5b, at step 120, external references made to point A enter. At step 122, the present invention translates file attributes to a unique identifier, and then, at step 124 uses that unique identifier to build the name of a regions file. At step 130, the invention attempts to open the regions file—which results in a check to see if it already exists. If it does, control flows to step 126, which makes an external reference call to point C. At decision block 128, upon return from the call, the invention checks the regions file for the section requested to see whether the residency indicator 60 indicates that that section is resident on the disk. If it is, control flows to step 140.

Still in FIG. 5b, if the requested section is not resident, the present invention, at step 136 reads the requested section from tertiary storage 40 and then issues a start read ahead at step 138. Next, an external reference call is made to point E in the next flowchart.

If a managed regions file 30 was not found to exist at step 130, the invention, at step 134 creates it. At step 144 the new managed regions file is identified as being controlled by the HSM of the present invention. And at step 146, the invention translates the file attributes to a unique identifier, using that at step 150 to build a file name. At step 152, the file is created using the new name and extended attribute information is set. The DMIG specification mentioned above as the interface specification used in a preferred embodiment, does not provide for extended attributes such as the staging identifiers, residency identifiers, etc. Consequently, the present invention creates these extended attributes at step 152 and sets their initial values. As will be apparent to those skilled in the art, other techniques for creating unique identifiers and associating attributes with them can be used, such as table lookups from user provided lists, for example. Control then flows to step 154, where control passes to Point C. While still in FIG. 5b, note that external references to Point B would enter at step 148 and follow the flow thereafter.

Figure 5C:
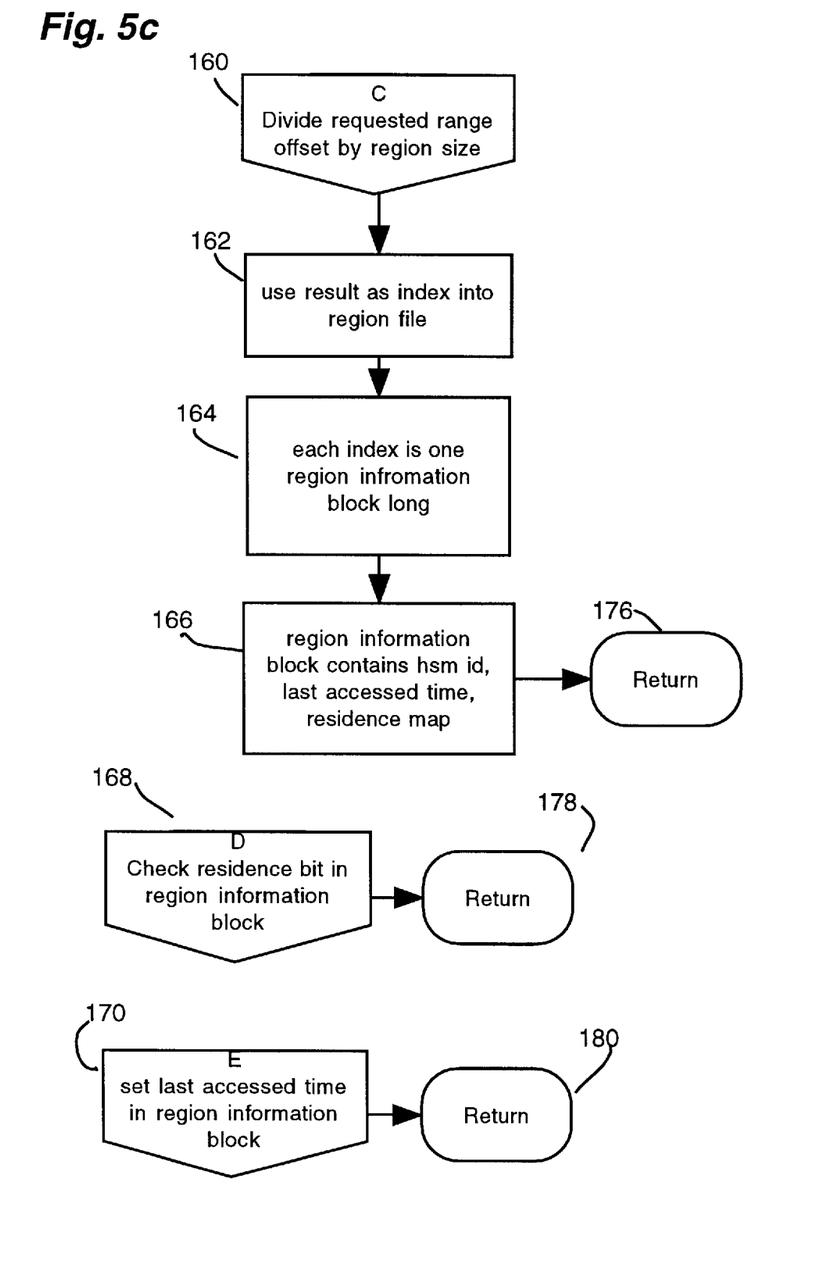
FIG. 5c is a flow diagram of the present invention.

Now turning to FIG. 5c, external reference calls to Point C enter at step 160, where the requested range offset is divided by the region size. The result of that step is used at step 162 to index into the managed regions file 30, since, as indicated at steps 164 and 166, each index is one region information block long and the region information block contains the HSM identifier, the last accessed time, and the residency indicator 60. Once the index has been created, a return to the caller is made at step 176.

At step 168, external calls to Point D enter, where the residency indicator 60 in the vector entry is made, and then control is returned to the caller at step 178.

At step 170, external calls to Point E enter, where the last accessed time stamp data is entered, followed by a return to caller at step 180.

Figure 5D:
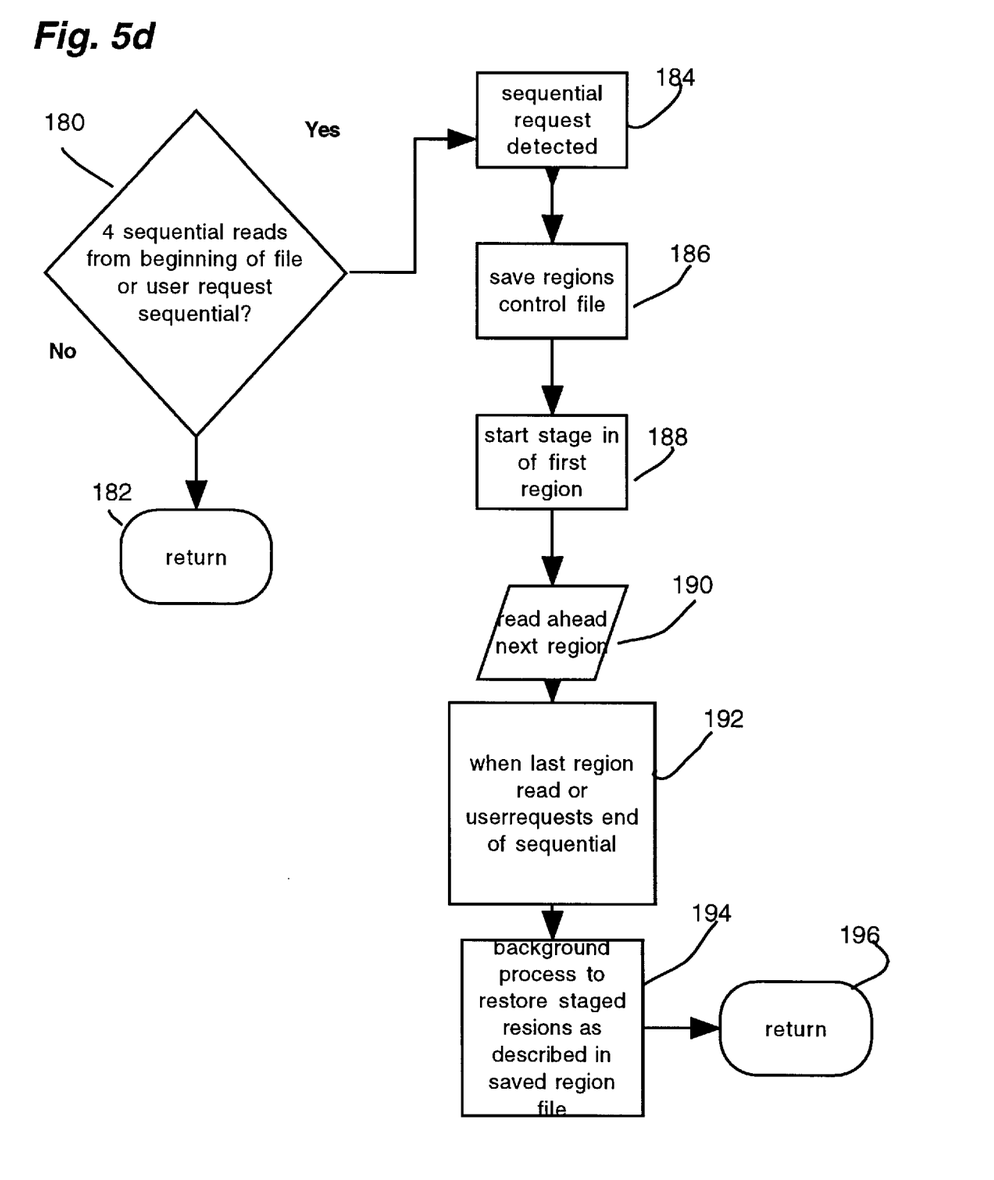
FIG. 5d is a flow diagram of the present invention.

Turning now to FIG. 5d, the present invention's way of managing sequential requests is shown. As mentioned above, in the past if the database was backed up by a series of sequential read and copy commands, that would have had the effect of making all files and records in it active and thus causing them all to be read into secondary storage on local disks 20. The processing used to prevent that from occurring for any sequential access pattern is shown in FIG. 5d. At step 180, the present invention keeps track of the accesses to determine if there have been either four sequential reads from the beginning of the file or if the user has made a multiple sequential access request. If either has occurred, control flows to step 184, at which it is noted that a sequential request has been detected. The invention then, at step 186 saves the managed regions file 30, by making a copy and storing it elsewhere on secondary storage 20, thus preserving the status of the database immediately prior to the multiple sequential access. Next, at step 188, migration software 15 starts staging in the first region, while issuing a read ahead for the next region at step 190. Processing proceeds in this way until the last region is read or there are no more sequential requests—these are detected at step 192. At this point, the invention starts a background process to restore the regions to the status described in the saved managed regions file 30. When that is complete, control returns to the caller at step 196.

While a preferred embodiment of the present invention is implemented as a program written in the C programming language and operates as part of applicant's Assignees's EPOCH HSM software systems, as will be apparent to those skilled in the art, other programming languages and HSM systems could be used. Additionally, although the preferred embodiment uses a software program implementation, it will be apparent that the logic of the present invention could also be embodied in firmware or hardware circuitry.

Those skilled in the art will appreciate that the embodiments described above are illustrative only and that other systems in the spirit of the teachings herein fall within the scope of the invention.

What is claimed is:

1. In a computer system having secondary storage media and tertiary storage media accessible to it through a filesystem operating as part of the computer systems's operating system, the computer system also communicating with an hierarchical storage management system for migrating data between secondary and tertiary storage media, and the computer system also having database software for accessing databases stored on the secondary storage media, an apparatus for performing hierarchical storage management for a database, comprising:

a managed regions file residing on secondary storage media and having at least one entry in it corresponding to a physical area of the database, the entry including a last accessed timestamp and region attributes;

an interceptor operating with the filesystem to intercept input/output requests made by the database software to the database, the interceptor communicating with the managed regions file for the database in such as way as to update the last accessed timestamp and region attributes and create a migration candidates list;

migration software operating as part of the hierarchical storage management system and responsive to signals sent by the interceptor to recall regions previously migrated to tertiary storage by copying them into secondary storage and to select from the candidates list any region to be migrated from secondary to tertiary storage.

2. The apparatus of claim 1, wherein the entry in the managed regions file further comprises an entry having a size that is optimized for input/output performance on disk and tape media.

3. The apparatus of claim 1, wherein the region attributes in the managed regions file further comprise a staging identifier field, a baseline backup identifier field, and a residency indicator field.

4. The apparatus of claim 1, wherein the interceptor further comprises a sequential input/output detector capable of determining when a series of sequential input/output requests are being made to the database and saving the status of the managed regions file before such requests are completed by copying the managed regions file to a second secondary storage area, so that when the sequential requests are completed, the managed regions file can be copied back to its first secondary storage area, thereby preventing a distorted view of activity on the database that sequential requests might have caused.

5. In a computer system having secondary storage media and tertiary storage media accessible to it through a filesystem operating as part of the computer systems's operating system, the computer system also communicating with an hierarchical storage management system for migrating data between secondary and tertiary storage media, and the computer system also having database software for accessing databases stored on the secondary storage media, a method for performing hierarchical storage management for a database, comprising the steps of:

creating a managed regions file residing on secondary storage media and having at least one entry in it corresponding to a physical area of the database, the entry including a last accessed timestamp and region attributes;

intercepting, through the filesystem input/output requests made by the database software to the database, and communicating with the managed regions file for the database in such as way as to update the last accessed timestamp and region attributes and create a migration candidates list;

operating migration software as part of the hierarchical storage management system and responsive to signals sent by the intercepting step to recall regions previously migrated to tertiary storage by copying them into secondary storage and to select from the candidates list any region to be migrated from secondary to tertiary storage.

6. The method of claim 5, wherein the step of creating an entry in the managed regions file further comprises the step of creating an entry having a size that is optimized for input/output performance on disk and tape media.

7. The method of claim 5, wherein the step of creating an entry in the regions file further comprises the step of creating a staging identifier field, a baseline backup identifier field, and a residency indicator field.

8. The method of claim 5, wherein the step of intercepting further comprises the step of determining when a series of sequential input/output requests are being made to the database and saving the status of the managed regions file before such requests are completed by copying the managed regions file to a second secondary storage area, so that when the sequential requests are completed, the managed regions file can be copied back to its first secondary storage area, thereby preventing a distorted view of activity on the database that sequential requests might have caused.

9. In a computer system having secondary storage media and tertiary storage media accessible to it through a filesystem operating as part of the computer systems's operating system, the computer system also communicating with an hierarchical storage management system for migrating data between secondary and tertiary storage media, and the computer system also having database software for accessing databases stored on the secondary storage media, an apparatus for performing hierarchical storage management for a database, comprising:

means for creating a managed regions file residing on secondary storage media and having at least one entry in it corresponding to a physical area of the database, the entry including a last accessed timestamp and region attributes;

means for intercepting, through the filesystem input/output requests made by the database software to the database, and communicating with the managed regions file for the database in such as way as to update the last accessed timestamp and region attributes and create a migration candidates list;

means for operating migration software as part of the hierarchical storage management system and responsive to signals sent by the intercepting step to recall regions previously migrated to tertiary storage by copying them into secondary storage and to select from the candidates list any region to be migrated from secondary to tertiary storage.

10. The apparatus of claim 9, wherein means for creating an entry in the managed regions file further comprises a means for creating an entry having a size that is optimized for input/output performance on disk and tape media.

11. The apparatus of claim 9, wherein the means for creating an entry in the regions file further comprises means for creating a staging identifier field, a baseline backup identifier field, and a residency indicator field.

12. The apparatus of claim 9, wherein the means for intercepting further comprises means for determining when a series of sequential input/output requests are being made to the database and saving the status of the managed regions file before such requests are completed by copying the managed regions file to a second secondary storage area, so that when the sequential requests are completed, the managed regions file can be copied back to its first secondary storage area, thereby preventing a distorted view of activity on the database that sequential requests might have caused.

* * * * *